United States Patent

Gocho et al.

[15] 3,701,030

[45] Oct. 24, 1972

[54] FM DEMODULATOR CIRCUIT USING PHASE-SHIFTING MULTIPLIER

[72] Inventors: Yukisato Gocho, Yamato; Takahiro Inokuchi, Tokyo, both of Japan

[73] Assignee: Tokyo Kabushiki Kaisha, Tokyo-to, Japan

[22] Filed: Sept. 20, 1971

[21] Appl. No.: 181,908

[30] Foreign Application Priority Data

Sept. 22, 1970 Japan ......................45/83095

[52] U.S. Cl. ...................329/134, 329/112, 329/137

[51] Int. Cl. ................................................H03d 3/00

[58] Field of Search.............329/110, 126, 130–134, 329/137, 138, 112; 325/347

[56] References Cited

UNITED STATES PATENTS

| | | | |
|---|---|---|---|
| 2,922,040 | 1/1960 | Browder | ................329/134 X |
| 3,351,864 | 11/1967 | Scribner | ....................329/126 |

*Primary Examiner*—Alfred L. Brody
*Attorney*—Robert E. Burns et al.

[57] ABSTRACT

An FM demodulator circuit in which is used a phase-shifting multiplier comprising a limiter for obtaining an output of a substantially rectangular waveform, a phase shifter for shifting the phase of the output of the limiter by 90°, a multiplier for producing the vector product of the output of the limiter and the output of the phase shifter, and a low-pass filter for obtaining a demodulated signal, is further improved by the provision of a waveform converter for converting the rectangular waveform into a substantially triangular waveform, between the limiter and the phase shifter, so that a reference signal for the multiplier is thereby made to assume a substantially triangular waveform.

3 Claims, 5 Drawing Figures

FM DEMODULATOR CIRCUIT USING PHASE-SHIFTING MULTIPLIER

BACKGROUND OF THE INVENTION

This invention relates generally to FM demodulator circuits and more particularly to a type thereof wherein a phase-shifting multiplier is employed.

Heretofore, for the demodulation of an audio signal in, for instance, television receivers, a ratio demodulator has been employed. However, wide use of the ratio demodulator circuit is somewhat restricted by its comparatively complicated organization and requirement for skill in its adjustment.

Recently, a demodulator circuit employing a phase-shifting multiplier is about to be used widely because of its far simpler organization and far easier adjustment.

This type of demodulator circuit employs an amplitude limiter at its forward stage, and one part of the output signal ordinarily of a rectangular waveform is thereafter supplied directly to an input terminal of a multiplier circuit, while the remainder of the output signal is applied to the other input terminal of the multiplier circuit through a 90° phase shifter. When the two parts of the signal are applied simultaneously, the output signal from the multiplier includes a component equalling the vector product of the two input signals, and when the output signal is passed through a low-pass filter, a demodulated signal of the FM input signal can be obtained.

However, if the FM input signal applied to the limiter includes a partly AM-modulated component, such a component will affect the operation of the multiplier in a subsequent stage as hereinafter described more fully, and the AM suppression ratio of the demodulator will thereby be aggravated.

SUMMARY OF THE INVENTION

Therefore, a primary object of the present invention is to provide an improved FM demodulation circuit wherein the above described drawbacks of the conventional circuits can be substantially overcome.

Another object of the present invention is to provide an improved FM demodulation circuit which is simple in organization and is easily adjusted.

Still another object of the present invention is to provide an improved FM demodulation circuit wherein the AM suppression ratio is sufficiently high (AM including ratio is sufficiently low).

These and other objects of the present invention can be achieved by an improved FM demodulation circuit comprising a limiter for obtaining an output of a substantially rectangular waveform, a phase shifter for shifting the phase of the output of the limiter by 90°, a multiplier for obtaining the vector product of the output of the limiter and output of the phase shifter, and a low-pass filter, wherein, as an improvement, a waveform converter for converting the rectangular waveform into a triangular or sinusoidal waveform is provided between the limiter and the phase shifter, whereby the reference signal of the multiplier is made to assume a triangular or sinusoidal waveform.

The nature, principle, and utility of the present invention will be better understood from the following detailed description of the invention when read in conjunction with the accompanying drawings.

DETAILED DESCRIPTION OF THE INVENTION

Figure 1:
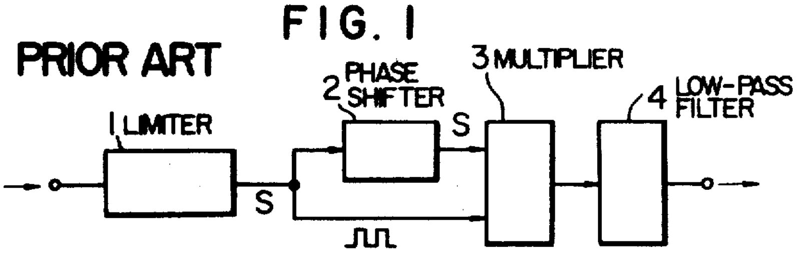
FIG. 1 is a block diagram showing a conventional FM demodulator circuit of a phase-shifting multiplier type.

As shown in FIG. 1, a conventional FM demodulating circuit of a phase-shifting multiplier type comprises a limiter 1, a phase shifter 2 for shifting the phase of the output signal from the limiter which is generally of a rectangular waveform by 90°, a multiplier 3 for obtaining the vector product of the outputs from the limiter and the phase shifter, and a low-pass filter 4 for filtering the output of the multiplier.

Figure 3A:
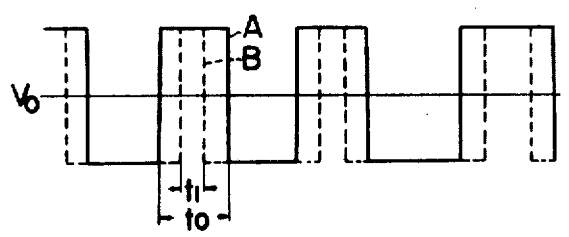
FIG. 3(a) PRIOR ART
FIGS. 3(*a*) and 3(*b*) are diagrams showing the switching operation of the multiplier due to a reference signal in a conventional circuit and in the circuit according to the present invention, respectively.
Figure 3B:
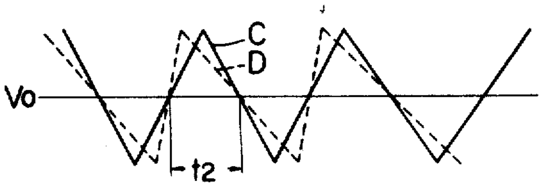
Figure 4:
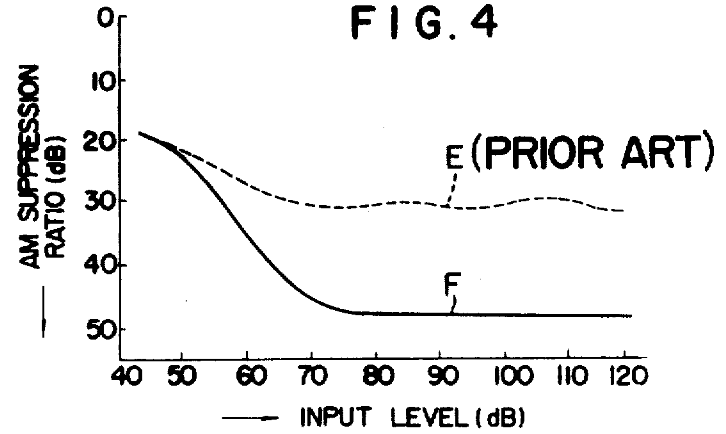
FIG. 4 is a graphical representation of the AM suppression ratios in the conventional circuit and in the circuit according to the present invention.

As stated in hereinbefore, when the input FM signal applied to the limiter 1 includes an AM modulated component, the waveform of the output signal S is transformed from A to B in FIG. 3(*a*) because of the unsymmetrical nature of the operation of the limiter 1. This means that the width of a rectangular wave to be employed as a reference signal for the multiplier 3 is varied by the AM component, changing the switching time of the multiplier 3 from $t_o$ to $t_1$, which results in the demodulation of an AM component corresponding to $t_o - t_1$, whereby the AM suppression ratio constituting an important characteristic of an FM demodulation circuit generally deteriorates as shown by the curve E in FIG. 4.

Figure 2:
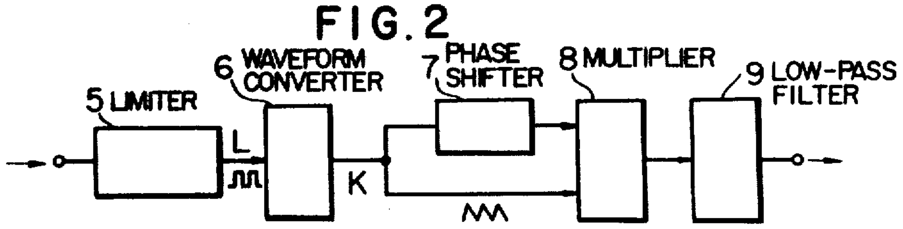
FIG. 2 is a block diagram showing a FM demodulator circuit according to the present invention which is also of a phase-shifting multiplier type.

For preventing the above described deterioration of the AM suppression ratio, the variation of the switching time of the multiplier due to the AM component is eliminated by the provision of a waveform conversion circuit 6 after the limiter 5 in FIG. 2 to convert the waveform of the reference signal entering the multiplier 8 from the above mentioned rectangular waveform to a substantially triangular waveform. This waveform conversion circuit 6 may be composed of an integrating circuit having a suitable time-constant in consideration of the central frequency of the limiter 5. In the circuit of FIG. 2, a 90° phase shifter 7 and a low-pass filter 9 are also provided as in the case of the conventional circuit in FIG. 1.

Thus, the waveform of the output signal K from the waveform conversion circuit 6 is rendered into a substantially triangular configuration in contrast to the input signal L of a rectangular configuration, and this substantially triangular output signal K of the conversion circuit 6 is employed as a reference signal in the multiplier 8. As shown in FIG. 3(*b*), the reference signal of substantially triangular configuration offers a switching time $t_2$ of the multiplier 8 at the switching level $v_o$ of the reference signal. This means that regardless of the input signal to the waveform conversion circuit 6 being changed, for instance, from A to B in FIG. 3($a$), the switching time $t_2$ remains constant although the output reference signal from the conversion circuit 6 is thereby changed from C to D as shown in FIG. 3($b$).

Accordingly, even if the rectangular output signal from the limiter is varied in width because of the inclusion of an AM component, the switching time of the multiplier 8 under the action of a reference signal is not influenced by the variation of the width, and the AM suppression ratio of the demodulating circuit can be substantially improved. Curve F in FIG. 4 indicates experimental values of the AM suppression ratio of the embodiment of the invention wherein the waveform conversion circuit 6 is employed, and when the curve F is compared with the curve E indicating the AM suppression ratio of the conventional circuit, the advantageous feature of the invention will be apparent.

As described above, according to the present invention, the reference signal applied to the multiplier is converted from a rectangular form to a substantially triangular form by means of the waveform conversion circuit, whereby the switching time of the multiplier cannot be affected by the width of the rectangular output signal from the limiter which may be varied by the inclusion of an AM component in the input signal of the limiter. As a result, the AM suppression ratio of the FM demodulation circuit can be improved to an extent which could not be attained by the conventional type of the circuit.

Although the waveform conversion circuit has been described above as being capable of converting a rectangular waveform to a substantially triangular waveform, it should be noted that a sinusoidal waveform may also be included in the substantially triangular waveform, and in this case also, a similar advantageous effect as in the above described example can be obtained.

We claim:

1. In an FM demodulating circuit of a phase-shifting and multiplying type comprising, a limiter for obtaining a substantially rectangular waveform output, a phase shifter for shifting the phase of the output of the limiter by 90°, a multiplier for producing the vector product of the output of the limiter and the output of the phase shifter, and a low-pass filter for producing a demodulated signal, the improvement comprising a waveform converter connected between the limiter and the phase shifter for converting the rectangular waveform into a substantially triangular waveform applied as a reference signal to the multiplier as a substantially triangular waveform.

2. An FM demodulator circuit as set forth in claim 1 wherein the substantially triangular waveform includes a sinusoidal waveform.

3. An FM demodulator circuit as set forth in claim 1 wherein the multiplier is of a type having a switching time determined by the reference signal.

* * * * *